United States Patent
Xu et al.

(10) Patent No.: US 11,261,553 B2
(45) Date of Patent: Mar. 1, 2022

(54) METHOD FOR TERMINATING REMOTE CONTROL OVER WASHING MACHINE

(71) Applicant: QINGDAO HAIER DRUM WASHING MACHINE CO., LTD., Shandong (CN)

(72) Inventors: Sheng Xu, Shandong (CN); Zhenxing Huang, Shandong (CN); Wenwei Li, Shandong (CN); Jun Wu, Shandong (CN)

(73) Assignee: QINGDAO HAIER DRUM WASHING MACHINE CO., LTD., Shandong (CN)

( * ) Notice: Subject to any disclaimer, the term of this patent is extended or adjusted under 35 U.S.C. 154(b) by 24 days.

(21) Appl. No.: 16/497,617

(22) PCT Filed: Mar. 23, 2018

(86) PCT No.: PCT/CN2018/080143
§ 371 (c)(1),
(2) Date: Sep. 25, 2019

(87) PCT Pub. No.: WO2018/177199
PCT Pub. Date: Oct. 4, 2018

(65) Prior Publication Data
US 2020/0040507 A1  Feb. 6, 2020

(30) Foreign Application Priority Data
Mar. 27, 2017 (CN) .......................... 201710187979.1

(51) Int. Cl.
*D06F 34/05* (2020.01)
*D06F 33/32* (2020.01)
(Continued)

(52) U.S. Cl.
CPC .............. *D06F 34/05* (2020.02); *D06F 33/32* (2020.02); *D06F 33/30* (2020.02);
(Continued)

(58) Field of Classification Search
CPC ............. D06F 2101/00; D06F 2105/58; D06F 2105/62; D06F 2212/02; D06F 33/00;
(Continued)

(56) References Cited

U.S. PATENT DOCUMENTS

| 2014/0067094 A1 | 3/2014 | Park et al. |
| 2014/0067131 A1 | 3/2014 | Park et al. |

(Continued)

FOREIGN PATENT DOCUMENTS

| CN | 101161911 A | 4/2008 |
| CN | 103266443 A | 8/2013 |

(Continued)

OTHER PUBLICATIONS

Machine translation of CN104131442A (Year: 2014).*
(Continued)

*Primary Examiner* — Douglas Lee
(74) *Attorney, Agent, or Firm* — Buchanan Ingersoll & Rooney PC

(57) ABSTRACT

A method for terminating remote control over a washing machine wherein when shutdown control over the washing machine is triggered, the washing machine sends an instruction to terminate a channel between the washing machine and a mobile terminal connected with the washing machine, and shuts down. The shutdown control is triggered in a short-range or remote manner. By this method a termination instruction is sent before the washing machine shuts down to terminate a channel between the washing machine and the mobile terminal, it is ensured that the channel between the washing machine and a mobile terminal has already been cut (Continued)

off before the washing machine shuts down, such that the washing machine is no longer controlled by the mobile terminal connected with the washing machine the last time when being turned on next time, for improving security of washing machine control.

9 Claims, 2 Drawing Sheets

(51) Int. Cl.
*D06F 105/58* (2020.01)
*D06F 105/62* (2020.01)
*D06F 101/00* (2020.01)
*D06F 33/30* (2020.01)

(52) U.S. Cl.
CPC ...... *D06F 2101/00* (2020.02); *D06F 2105/58* (2020.02); *D06F 2105/62* (2020.02)

(58) Field of Classification Search
CPC .......... D06F 33/32; D06F 34/05; D06F 33/30; D06F 34/28; H04M 1/72415; H04M 1/72533
See application file for complete search history.

(56) References Cited

U.S. PATENT DOCUMENTS

| | | | |
|---|---|---|---|
| 2014/0085061 A1* | 3/2014 | Shimizu | G08C 17/02 340/12.5 |
| 2014/0148147 A1 | 5/2014 | Tak et al. | |

FOREIGN PATENT DOCUMENTS

| | | | | |
|---|---|---|---|---|
| CN | 103685450 A | | 3/2014 | |
| CN | 103685451 A | | 3/2014 | |
| CN | 104131442 A | * | 11/2014 | .......... H04L 12/282 |
| JP | 2005-065912 A | | 3/2005 | |
| JP | 2015-042210 A | | 3/2015 | |
| JP | 2015042209 A | * | 3/2015 | |
| WO | 2014/176918 A1 | | 11/2014 | |

OTHER PUBLICATIONS

Machine translation of JP2015-042209A (Year: 2015).*
International Search Report (PCT/ISA/210) dated Jul. 3, 2018, by the Chinese Patent Office as the International Searching Authority for International Application No. PCT/CN2018/080143.
Written Opinion (PCT/ISA/237) dated Jul. 3, 2018, by the Chinese Patent Office as the International Searching Authority for International Application No. PCT/CN2018/080143.
European Search Report dated Jul. 6, 2021, issued in corresponding European Application No. 18775328.0. (5 pages).
Office Action (Notice of Reasons for Refusal) dated Apr. 6, 2021, in corresponding Japanese Patent Application No. 2019-553072 and English translation of the Office Action. (8 pages).

* cited by examiner

METHOD FOR TERMINATING REMOTE CONTROL OVER WASHING MACHINE

TECHNICAL FIELD

The present disclosure relates to the technical field of washing machines, and particularly relates to a method for terminating remote control over a washing machine.

BACKGROUND

With the development of the Internet of Things technology, the Internet of Things technology has already begun to constantly change our lifestyle and consumption habits. The development of the Internet of Things-based washing machine is also quite rapid, and the application of the Internet of Things-based laundry system is unprecedented. At present, users can remotely control the Internet of Things-based washing machine by using sensing devices such as computers and mobile terminals, and the users can also query the operating state of the washing machine in real time.

When the remote mobile terminal is used to control the washing machine, the termination and connection processing between the mobile terminal and the washing machine is involved. When the washing machine shuts down after executing programs, it is also necessary to terminate the channel between the washing machine and the mobile terminal connected with the washing machine. In addition, in a family, there may be multiple people controlling the washing machine at the same time. Sometimes the mobile terminal accessed first needs to be terminated for transferring the control right to other controllers. Or sometimes, when the currently accessed mobile terminal is far away from the washing machine, precise and effective control cannot be realized, it is also necessary for the currently accessed mobile terminal to terminate the control over the washing machine and transfer the control right to other control terminals or washing machine controllers in a room. Here involves different mobile terminal termination methods and control programs of the washing machine.

In view of this, the present disclosure is provided.

SUMMARY

The technical problem to be solved by the present disclosure is to overcome the deficiencies of the prior art, and to provide a specific execution manner and a subsequent processing method in which a washing machine actively or passively terminatesterminates remote control in different situations.

In order to solve the above technical problems, the basic idea of the adopted technical solution of the present disclosure is as follows.

In one aspect, the present disclosure discloses a method for terminating remote control over a washing machine, wherein when the shutdown control over the washing machine is triggered, the washing machine sends a termination instruction to termination the channel between the washing machine and the mobile terminal currently connected with the washing machine, and shuts down; the shutdown control over the washing machine is triggered in a short-range or remote manner, and the remote triggering is performed by the mobile terminal.

Further, when the shutdown control over the washing machine is triggered, the mobile terminal receives the termination instruction from the washing machine and makes a judgment, and if the washing machine is still executing a certain program, the mobile terminal feeds back a signal to the washing machine, maintains the channel currently established between the mobile terminal and the washing machine, and controls the washing machine to be kept on until the washing machine finishes executing the program.

Further, the following steps are included.

S1, triggering a shutdown control over the washing machine in a short-range or remote manner, and the washing machine sending a termination instruction to the mobile terminal;

S2, the mobile terminal currently connected with the washing machine receiving the termination instruction and making a judgment in combination with the operating state of the washing machine;

S3, when it is judged that the washing machine is executing a certain program, the mobile terminal maintains the channel between the mobile terminal and the washing machine and controlling the washing machine to shut down after the washing machine finishes executing the program, otherwise, the mobile terminal terminating the channel between the mobile terminal and the washing machine, and the washing machine being shut down.

Further, before the washing machine shuts down, the mobile terminal connected with the washing machine directly sends a termination signal to the washing machine to actively terminate the channel established between the mobile terminal and the washing machine. If the washing machine is executing a certain program, the washing machine feeds back a signal to the mobile terminal, and/or terminates the channel between the washing machine and the mobile terminal and continues to execute the program till the program is completed; or the washing machine feeds back a signal to the mobile terminal, and/or terminates the channel between the washing machine and the mobile terminal, and suspends the operation for waiting to be controlled by the next control terminal.

Further, before the washing machine shuts down and the operation executed by the washing machine is completed, the mobile terminal connected with the washing machine directly sends a termination signal to the washing machine, and the washing machine terminates the channel between the washing machine and the mobile terminal connected with the washing machine, and performs shutdown.

Further, if the washing machine is controlled by a plurality of mobile terminals, priority is set for the plurality of mobile terminals, and when the mobile terminal with higher priority accesses and establishes a channel with the washing machine, the mobile terminal with lower priority automatically terminates the channel established between the mobile terminal with lower priority and the washing machine.

Further, the terminating method further includes: when the channel established between the mobile terminal and the washing machine is terminated under unexpected situations, the channel is automatically connected when the network works smoothly; and the unexpected situations include: network outages and loss of power.

Further, during the unexpected termination of the channel connected between the washing machine and the mobile terminal, the washing machine continues executing the current program until the program is completed.

Further, the washing machine is provided with an activation button, and the activation button receives a termination signal or sends a termination instruction to complete the termination of the channel between the washing machine and the mobile terminal.

Further, the mobile terminal and the washing machine transmit termination instructions and/or termination signals through a server.

Another object of the present disclosure is to prevent the mobile terminal from manipulating the illegal intervention in the normal operation of the washing machine. To achieve the above object, the present disclosure also provides a method for terminating remote control over a washing machine, wherein when the washing machine receives a shutdown instruction sent by a mobile terminal, the washing machine judges whether the current operating state of the washing machine can be terminated or not, and if so, the washing machine normally shuts down; if not, the washing machine operates normally and feeds back information that the washing machine cannot shut down normally to the mobile terminal.

Further, when receiving the shutdown instruction, the washing machine judges whether the real-time operating state can be terminated or not, and the washing machine shuts down normally, or does not shut down and feeds back the information that the washing machine cannot shut down normally to the mobile terminal according to the judgment result;

or, when receiving the shutdown instruction, the washing machine feeds back the real-time operating state to the mobile terminal, and the mobile terminal judges whether the uploaded real-time operating state of the washing machine can be terminated or not, and sends control signals that enable the washing machine to shut down normally or not to shut down to the washing machine according to the judgment result.

After adopting the above technical solution, the present disclosure has the following beneficial effects compared with the prior art.

According to the method for terminating remote control over the washing machine of the present disclosure, a termination instruction is sent to terminate the channel between the washing machine and the mobile terminal before the washing machine shuts down to ensure that the channel between the washing machine and the mobile terminal is cut off before the washing machine shuts down, such that the washing machine is no longer controlled or affected by the mobile terminal connected with the washing machine last time when the washing machine being turned on next time, so as to improve the security of the control over the washing machine.

Further, in the case that control is inconvenient or unsuitable, the mobile terminal can send a termination signal to the washing machine to cut off the channel between the mobile terminal and the washing machine only by transmitting signals and triggering the activation button, so that the operation is simple, and the efficiency is high.

When a plurality of mobile terminals is used for controlling the washing machine, the mobile terminal with higher priority is endowed with a main control right by setting the priority. The mobile terminal with higher priority can control the washing machine by entering the channel between the mobile terminal with higher priority and the washing machine at any time, thereby expanding the use method types of the mobile terminal, and further enriching the functions of the washing machine.

Moreover, when the mobile terminal sends a shutdown instruction to the washing machine, the operating state of the washing machine is judged to determine whether the current operating state of the washing machine can support immediate shutdown, so that the conditions that unsmooth operation of the washing machine, energy waste, and even damaging of the washing machine are caused by the fact that the washing machine shuts down in the case of performing drying, or high-speed spin-drying and other situations can be avoided.

In the case that the washing machine and the mobile terminal are unexpectedly disconnected, the washing machine automatically performs the channel connection with the mobile terminal after the accidental failure is removed, thereby avoiding the use influence of the unexpected situation on the user and improving the user experience.

The specific embodiments of the present disclosure are described in further detail below in conjunction with the accompanying drawings.

BRIEF DESCRIPTION OF THE DRAWINGS

The drawings, as part of the disclosure, are intended to provide further understanding of the disclosure. Illustrative embodiments of the present disclosure and its description are used to explain the present disclosure, but do not constitute an undue limitation of the present disclosure. It is apparent that the drawings in the following description only accompany some embodiments, and other drawings may be obtained by those skilled in the art without any creative effort. In the drawing.

Figure 1:
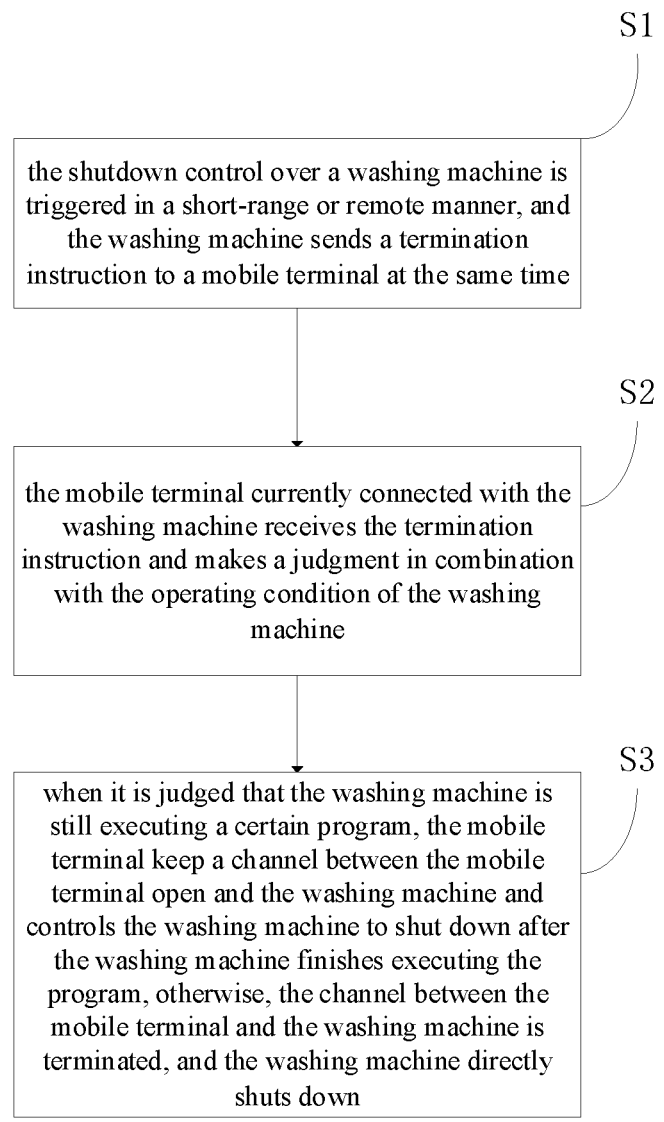
FIG. 1 is a flow diagram of a method for terminating remote control over a washing machine in an embodiment of the present disclosure.

It should be noted that these drawings and written descriptions are not intended to limit the conception scope of the disclosure in any way, but to illustrate the concept of the disclosure to those skilled in the art by referring to specific embodiments.

DETAILED DESCRIPTION

In order to make the purposes, technical solution and advantages of the embodiments of the present disclosure clearer, the technical solution of the embodiments of the present disclosure will be described clearly and completely in combination with the drawings in the embodiments of the present disclosure. The following embodiments are used to illustrate the present disclosure instead of limiting the scope of the present disclosure.

In the description of the present disclosure, it should be pointed out that the orientation or position relations indicated by the terms "up", "down", "front", "back", "left", "right", "vertical", "external" and "external" are based on the orientation or position relations shown in the drawings, and are only for the convenience of describing the present disclosure and simplifying the description, rather than indicating or implying that the device or component must have the specific orientation, or to be constructed and operated in the specific orientation, and therefore shall not be construed as limiting the present disclosure.

In the description of the present disclosure, it should be noted that unless otherwise specified and defined, the terms "installation", "connection" should be understood in a broad sense, for example, it can be construed as fixed connection, removable connection, or integral connection; mechanical connection or electrical connection; direct connection or indirect connection through intermediate media. For those skilled in the art, the specific meaning of the above terms in the present disclosure can be understood in specific circumstances.

For a washing machine with the Internet of Things functions, the operating process involves the connection and termination processing of the washing machine and the remote control terminal. In the termination processing of the remote control, different conditions will be encountered, such as: coordination between the remote control terminal and the washing machine body control, remote switching among multiple control terminals, and unexpected situations of the washing machine. Under different conditions, the washing machine and the remote control terminal need to adopt different processing methods to ensure that the washing machine operates normally, and the user's experience is not affected.

Embodiment 1

For an Internet of Things-based washing machine, there are mainly two shutdown methods, one is short-range shutdown, and that is, a user directly triggers a shutdown module on the washing machine body to shut down the washing machine. And the other is a remote shutdown, that is, the user controls a remote mobile terminal to send a shutdown instruction to control the washing machine to shut down. Based on the characteristics of the Internet of Things-based washing machine, the user can control the related operation by manually making contact with the washing machine, or can control the washing machine by using the mobile terminal remotely. Therefore, when it comes to turn-on and shutdown, the above two situations will occur.

Further, before the washing machine performs the shutdown control, the channel between the washing machine and the mobile terminal currently connected with the washing machine needs to be terminated, which is included in a series of actions of the shutdown of the washing machine. The advantage of the setting is that the washing machine is prevented from being directly controlled by a mobile terminal not disconnected during when the washing machine is turned on next time. It is equivalent to performing a reset on the washing machine to ensure that an appropriate control device or method is re-selected when the washing machine is turned on next time.

When the shutdown control over the washing machine is triggered, there are two situations: first, the shutdown control at this time is a fault operation, for example: a short-range user or a remote mobile terminal user triggers the shutdown control over the washing machine when the washing machine has not completed yet the currently executed program; under this situation, the washing machine will send a termination instruction to the mobile terminal for requesting termination of the channel between the washing machine and the mobile terminal after receiving the shutdown control instruction.

Since the current program of the washing machine has not been completed, after receiving the termination instruction, the mobile terminal will make a judgment based on the current operating state of the washing machine. If it is judged by the mobile terminal connected to the washing machine that the washing machine has not completed a certain program, the mobile terminal will feed back a signal to the washing machine to remind the short-range user, and reject execution of the termination instruction of the washing machine as well as maintain the channel established between the mobile terminal and the washing machine, and control the washing machine to be kept on until the washing machine continue finishing executing the program. After completing the execution of the program, the washing machine performs shutdown and simultaneously cuts off the channel connected between the mobile terminal and the washing machine.

Second, the shutdown operation of the washing machine is a correct operation, the shutdown control is triggered after the washing machine has executed the programs required to be completed. In this case, after receiving the shutdown control instruction, the washing machine will send a termination instruction to the mobile terminal, and after the action is judged to be right, the mobile terminal executes the termination instruction to cut off the channel between the mobile terminal and the washing machine, and the washing machine directly shuts down.

Further, when the washing machine is connected to a certain mobile terminal, its real-time operating state is fed back and displayed on the mobile terminal, and the mobile terminal performs the analysis processing about whether to terminate the channel connected between the mobile terminal and the washing machine or not by automatic or manual analytical judgment.

Further, when the washing machine is controlled by a remote mobile terminal, the identification information is presented on the washing machine, and the short-range user can know that the remote user is controlling the washing machine at this time through the identifier, so the conflict between short-range operation and remote operation can be effectively avoided.

Specifically, FIG. 1 is a flow diagram of a method for terminating remote control over a washing machine in an embodiment of the present disclosure. It specifically includes the following steps.

S1, triggering the shutdown control over the washing machine in a short-range or remote manner, and the washing machine sending a termination instruction to a mobile terminal at the same time;

S2, the mobile terminal currently connected with the washing machine receiving the termination instruction and making a judgment in combination with the operation condition of the washing machine;

S3, when it is judged that the washing machine is still executing a certain program, the mobile terminal maintains the channel between the mobile terminal and the washing machine and controlling the washing machine to shut down after the washing machine finishes executing the program, otherwise, the channel between the washing machine and the mobile terminal is terminated, and the washing machine directly shuts down.

Embodiment 2

The difference between this embodiment and Embodiment 1 is that the mobile terminal actively sends a termination signal to request the cutoff of the channel between the mobile terminal and the washing machine before the shutdown instruction is triggered on the washing machine. Here, the switching problem of the control terminals related to the washing machine is involved. Before the washing machine shuts down, the mobile terminal currently connected with the washing machine actively cuts off the channel between the washing machine and the mobile terminal to transfer the remote control right to the short-range user, or the remote mobile terminal is not suitable for controlling the washing machine at this time and actively gives up the control right, or at this time the remote mobile terminal has finished the required washing operation, and the control right is vacated for other users to use the washing machine.

Specifically, if the washing machine has completed the current operation program after the mobile terminal sends out a termination signal, the channel between the washing machine and the mobile terminal will be cut off, and the washing machine performs shutdown. If the mobile terminal is still executing an unfinished program after the mobile terminal sends out a termination signal, the washing machine may choose to terminate the channel between the washing machine and the mobile terminal, and continue executing the program till the program is completed by itself, or the washing machine can choose to terminate the channel between the washing machine and the mobile terminal, and suspend the operation for waiting to be controlled by the next control terminal.

The next control terminal here is the control terminal of the washing machine or other remote mobile terminal. Of course, in the above case, the washing machine will feed back an unfinished signal to the mobile terminal for the mobile terminal user to make a judgment selection. If the mobile terminal user insists on performing channel termination or due to objective conditions, the channel termination must be performed, the washing machine performs subsequent control processes.

Embodiment 3

This embodiment is a further limitation of Embodiment 2. In the use process, the washing machine will be bound with a plurality of mobile terminals having security and trust relationships at the same time. When the plurality of mobile terminals is used for controlling the washing machine, priority is set for the plurality of mobile terminals. When the mobile terminal with a higher priority actively or automatically accesses the washing machine, the mobile terminal currently connected with the washing machine and having a lower priority will automatically terminate the channel established between it and the washing machine.

Preferably, during accessing, the mobile terminal with the higher priority receives a feedback signal from the washing machine or the mobile terminal with the lower priority to ask whether it still wants to access if there is other mobile terminal accessing the washing machine and controlling the washing machine. The feedback signal is used for allowing the mobile terminal with high priority to control and judge to give priority to the efficient realization of the operation of the washing machine.

Here, when the mobile terminal with higher priority accesses, the executing state of the current program of the washing machine is involved, and when the mobile terminal with lower priority transfers the control right of the washing machine to the mobile terminal with higher priority, the executing state of the washing machine is not affected. The current control data and the washing machine operating data are automatically transferred and cached to the mobile terminal with higher priority, and the take-over control is performed to ensure the normal operation of the washing machine.

Embodiment 4

This embodiment is a further limitation of Embodiment 3. When the channel between the mobile terminal and the washing machine is terminated due to unexpected situations, the channel between the mobile terminal and the washing machine is automatically reconnected when the unexpected fault is resolved. The unexpected situations here include network outages and loss of power. At this time, the cached data is stored on the mobile terminal to ensure smooth communication between the mobile terminal and the washing machine after resolving the unexpected situations, and the operation control over the washing machine can be performed normally.

Embodiment 5

This embodiment is a further limitation of Embodiment 1. For the washing machine accessing the Internet of Things, after receiving the shutdown instruction, the washing machine performs a series of inspections on its internal components to ensure that the user or the washing machine itself are not affected after the shutdown.

Specifically, the washing machine performs scanning inspections on an inner tub, a water inlet, a motor, etc., and the pre-shutdown inspections are performed based on the program control. When the shutdown instruction over the washing machine is triggered, the set of programs is called to inspect the washing machine. Here, the mobile terminal termination process is an inspection to the Internet of Things-based washing machine different from ordinary washing machines. Of course, in other cases, the Internet of Things-based washing machine is not connected to the mobile terminal at this time, but is controlled by a user who directly triggers a module on the machine body like a normal washing machine. At this time, the washing machine has detected that no mobile terminal is currently connected with the washing machine before the shutdown of the washing machine, thus there is no need to perform cut-off on the mobile terminal.

The various types of termination processing between the washing machine and the mobile terminal in the above embodiments are all realized by transmission via servers. Further, an activation button is arranged on the washing machine, and the activation button is a key design for the washing machine to access the Internet of Things. The activation button is mainly used to receive termination signals or send termination instructions to implement communication between the washing machine and the mobile terminal. The function of the activation button here is not limited to the termination control over the remote mobile terminal. Here, the programs executed by the washing machine mainly include a washing program, a rinsing program, a dewatering program, and so on, and are mainly some uninterruptible control programs of the washing machine.

Embodiment 6

This embodiment introduces a method for terminating remote control over a washing machine. When receiving a shutdown instruction sent by a mobile terminal, the washing machine judges whether the current operating state of the washing machine can be terminated or not, and if so, the washing machine normally shuts down; if not, the washing machine operates normally and feeds back information that the washing machine cannot shut down normally to the mobile terminal.

In this embodiment, when receiving the shutdown instruction, the washing machine judges whether the real-time operating state can be terminated or not, and normally shuts down, or does not shut down and feeds back the information that the washing machine cannot shut down normally to the mobile terminal according to the judgment result, so as to prevent the situation where useless power consumption and even component damage are caused by the fact that the mobile terminal sends a shutdown instruction to the washing machine when the washing machine is performing programs, such as drying, high-speed spin-drying and the like.

Figure 2:
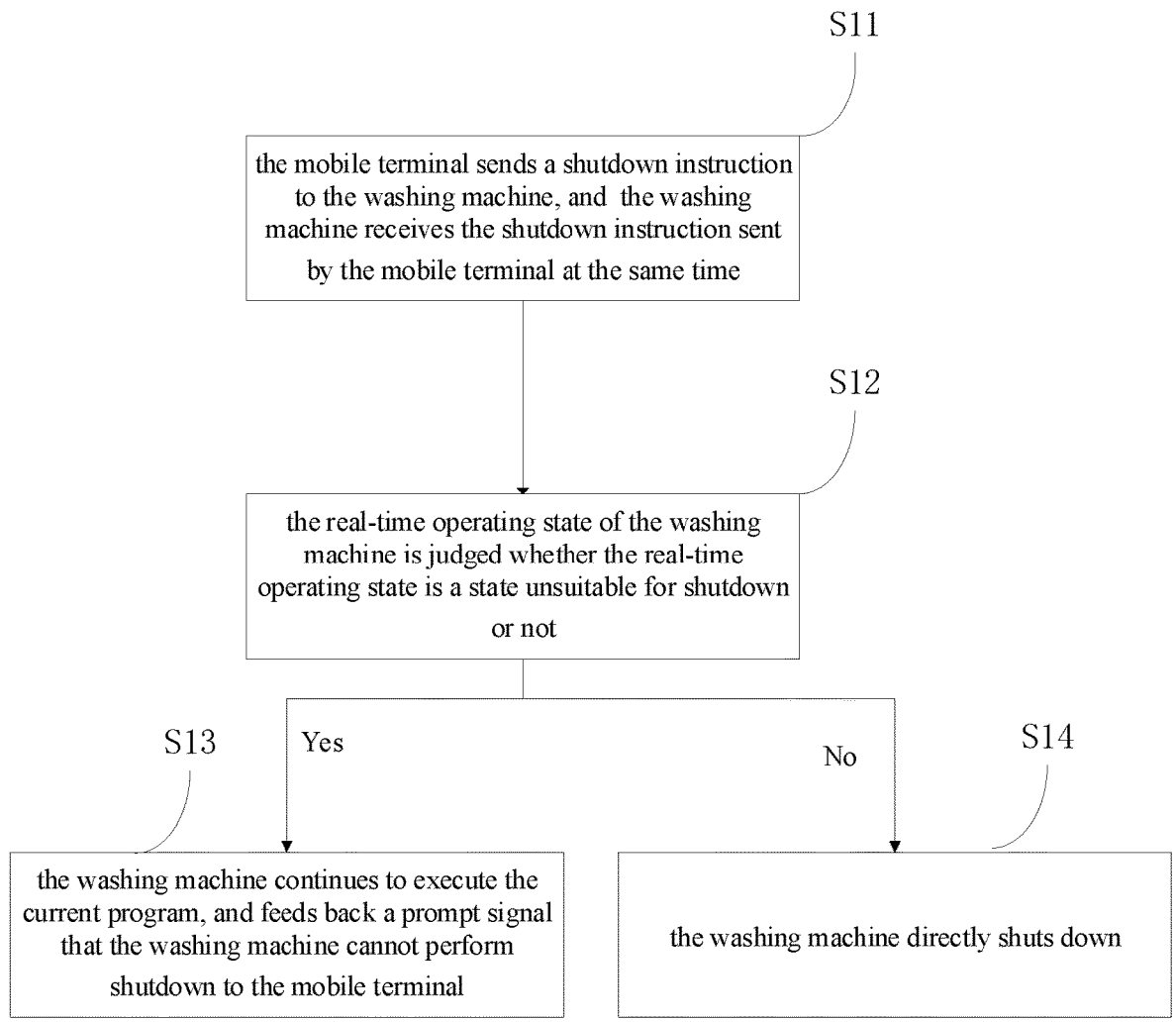
FIG. 2 is a flow diagram of a method for terminating remote control over a washing machine in another embodiment of the present disclosure.

FIG. 2 is a flow diagram of a method for terminating remote control over a washing machine in an embodiment of the present disclosure. It specifically includes the following steps:

S11, a mobile terminal sending a shutdown instruction to the washing machine, and the washing machine receiving the shutdown instruction sent by the mobile terminal at the same time;

S12, the real-time operating state of the washing machine being judged; if the real-time operating state of the washing machine is a state unsuitable for shutdown, S13 is performed; if the real-time operating state of the washing machine is a state suitable for shutdown, S14 is performed;

S13, the washing machine continuing to execute the current programs, and feeding back a prompt signal that the washing machine cannot perform shutdown to the mobile terminal;

S14, the washing machine directly shutting down.

In this embodiment, the state unsuitable for shutdown includes: drying, and/or high-speed spin-drying, etc.; and the state suitable for shutdown includes: any washing machine operating state other than the state unsuitable for shutdown, and standby state.

Through the above setting, after receiving the shutdown instruction sent by the mobile terminal, the washing machine makes reasonable judgment and performs corresponding shutdown actions after meeting the judgment conditions, thereby avoiding the occurrence of the condition that the washing machine shuts down when the washing machine is performing programs, such as drying, high-speed spin-drying and the like, and further, the occurrence of conditions of drying heat loss, energy wasting, and even damage of the parts of the washing machine can be avoided.

In this embodiment, the judgment of whether the real-time operating state of the washing machine is suitable for shutdown can also be performed by the mobile terminal; specifically, when receiving the shutdown instruction, the washing machine feeds back the real-time operating state to the mobile terminal, and the mobile terminal judges whether the uploaded real-time operating state can be terminated or not, and sends control signals that enable the washing machine to shut down normally or not to shut down to the washing machine according to the judgment result.

Through the above setting, the logic processing for judging whether the washing machine to shut down or not is performed by the mobile terminal, so as to omit a logic judgment component for the washing machine, and reduce the production cost of the washing machine. At the same time, after the real-time operating state of the washing machine is uploaded to the mobile terminal and the mobile terminal makes a judgment, the mobile terminal directly sends a correct instruction obtained after judgment to the washing machine, thus reducing the probability of misoperation of the washing machine, and greatly improving the logic operation efficiency in the washing machine control process.

The above embodiments are only preferred embodiments of the present disclosure, and are not intended to limit the present disclosure in any forms. Although the present disclosure has been disclosed with the preferred embodiments, it is not intended to limit the disclosure. Without departing from the range of the technical solution of the disclosure, those skilled in the art and familiar with the patent may come out equivalent embodiments after some changes or modifications according to the technical contents presented above, and any simple alterations, equivalent changes and modifications of the above embodiments in line with the technical essence of the disclosure without departing from contents of the technical solution of the disclosure should still fall into the scope of the technical solution of the present disclosure.

The invention claimed is:

1. A method for terminating remote control over a washing machine, wherein when a shutdown control over a washing machine is triggered, the washing machine sends a termination instruction to terminate a channel between the washing machine and a mobile terminal currently connected with the washing machine, and is shut down;

and the shutdown control over the washing machine is in a short-range triggering or a remote triggering, wherein the short-range triggering is that a user directly triggers a shutdown module on the washing machine body to shut down the washing machine, the remote triggering is performed by the mobile terminal;

when the shutdown control over the washing machine is triggered, the mobile terminal receives the termination instruction from the washing machine and makes a judgment;

if the washing machine is executing a certain program, the mobile terminal feeds back a signal to the washing machine, and keeps the channel currently established between the mobile terminal and the washing machine open, and controls the washing machine to keep operating until the washing machine finishes executing the certain program.

2. The method for terminating remote control over the washing machine according to claim 1, comprising the following steps:

S1, triggering the shutdown control over the washing machine in a short-range manner or a remote manner, and the washing machine sending the termination instruction to the mobile terminal;

S2, the mobile terminal currently connected with the washing machine receiving the termination instruction and making a judgment in combination with an operating state of the washing machine;

S3, if it is judged that the washing machine is executing the certain program, the mobile terminal keeping the channel between the mobile terminal and the washing machine open and controlling the washing machine to be shut down after the washing machine finishing executing the certain program, if it is judged that the washing machine is not executing the certain program, the channel between the washing machine and the mobile terminal being terminated, and the washing machine being shut down.

3. The method for terminating remote control over the washing machine according to claim 1, wherein before the washing machine is shut down, the mobile terminal connected with the washing machine sends a termination signal to the washing machine to actively terminate the channel established between the mobile terminal and the washing machine; if the washing machine is executing the certain program, the washing machine feeds back a signal to the mobile terminal, and/or terminates the channel between the washing machine and the mobile terminal, and continues to execute the certain program till the program is completed;

or the washing machine feeds back the signal to the mobile terminal, and/or terminates the channel between the washing machine and the mobile terminal, and suspends the certain program for waiting to be controlled by a next control terminal.

4. The method for terminating remote control over the washing machine according to claim 3, wherein before the washing machine is shut down and when the certain program is completed, the mobile terminal connected with the washing machine sends the termination signal to the washing machine, the washing machine terminates the channel between the washing machine and the mobile terminal connected with the washing machine, and is shut down.

5. The method for terminating remote control over the washing machine according claim 4, wherein during an unexpected termination of the channel connected between the washing machine and the mobile terminal, the washing machine continues to execute the certain program until the certain program is completed.

6. The method for terminating remote control over the washing machine according claim 5, wherein
the washing machine is provided with an activation button, and the activation button receives the termination signal or sends the termination instruction to terminate the channel between the washing machine and the mobile terminal.

7. The method for terminating remote control over the washing machine according claim 5, wherein
the mobile terminal and the washing machine transmit termination instructions and/or termination signals through a server.

8. The method for terminating remote control over the washing machine according to claim 1, wherein the washing machine is controlled by a plurality of mobile terminals, and priority is set for the plurality of mobile terminals, when a mobile terminal with higher priority accesses and establishes a channel with the washing machine, a mobile terminal with lower priority automatically terminates the channel established between the washing machine.

9. The method for terminating remote control over the washing machine according to claim 1, further comprising: when the channel established between the mobile terminal and the washing machine is terminated under unexpected situations, the channel is automatically connected when network works, wherein the unexpected situations include: network outages and loss of power.

* * * * *